US009322379B2

(12) United States Patent
Weis

(10) Patent No.: US 9,322,379 B2
(45) Date of Patent: Apr. 26, 2016

(54) PROCESS FOR PREPARING A DEFINED STARTING OPERATION SELECTABLE BY THE DRIVER

(71) Applicant: Bayerische Motoren Werke Aktiengesellschaft, Munich (DE)

(72) Inventor: Daniel Weis, Kranzberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 76 days.

(21) Appl. No.: 14/454,173

(22) Filed: Aug. 7, 2014

(65) Prior Publication Data
US 2014/0357449 A1 Dec. 4, 2014

Related U.S. Application Data

(63) Continuation of application No. PCT/EP2013/052189, filed on Feb. 5, 2013.

(30) Foreign Application Priority Data

Feb. 8, 2012 (DE) .......................... 10 2012 201 841

(51) Int. Cl.
B60W 10/06 (2006.01)
F02N 11/08 (2006.01)
(Continued)

(52) U.S. Cl.
CPC ........... *F02N 11/0803* (2013.01); *B60W 10/04* (2013.01); *B60W 10/10* (2013.01);
(Continued)

(58) Field of Classification Search
CPC . Y10T 477/68; Y10T 477/79; F02N 11/0803; B60W 10/06; B60W 30/18027; B60W 30/18172; B60W 2050/0089; B60W 40/068; B60W 40/13; B60K 28/16
USPC .......................... 477/181, 107, 900, 904, 905
See application file for complete search history.

(56) References Cited

U.S. PATENT DOCUMENTS 5,737,713 A * 4/1998 Ikeda .................... B60K 28/16
180/197
6,494,282 B1 * 12/2002 Hessmert .............. B60K 28/16
180/197
(Continued)

FOREIGN PATENT DOCUMENTS

DE 103 27 438 A1 1/2004
DE 103 05 297 A1 8/2004
(Continued)

OTHER PUBLICATIONS

International Search Report (PCT/ISA/210) dated May 10, 2013, with English translation (Seven (7) pages).
(Continued)

*Primary Examiner* — Roger Pang
(74) *Attorney, Agent, or Firm* — Crowell & Moring LLP

(57) ABSTRACT

A process is provided for preparing a defined starting operation of a motor vehicle selectable by the driver, having a starting element arranged between an engine and a transmission. In the event of a maximal power demand by the driver and in the event of the selection of the defined starting operation by an electronic control unit, the rotational speed or the torque of the engine is set to a specified value, wherein the specified value is automatically determined by the electronic control unit as function of a determined friction parameter, by which at least one relative prediction concerning the transmissible drive torque to be expected for the acceleration operation can be made, such that, by use of the specified during the starting and acceleration operation following the preparation, the maximally possible drive torque is achieved for the best possible acceleration. The friction parameter is determined as a function of a state variable determined during a preceding defined starting operation, which state variable influences the occurring drive torque.

10 Claims, 1 Drawing Sheet

(51) Int. Cl.
*B60W 10/04* (2006.01)
*B60W 10/10* (2012.01)
*B60W 30/18* (2012.01)
*B60W 40/13* (2012.01)
*B60W 50/08* (2012.01)
*B60K 28/16* (2006.01)
*B60W 40/068* (2012.01)
*B60W 50/00* (2006.01)

(52) U.S. Cl.
CPC .......... *B60W30/18027* (2013.01); *B60K 28/16* (2013.01); *B60W 10/06* (2013.01); *B60W 30/18172* (2013.01); *B60W 40/068* (2013.01); *B60W 40/13* (2013.01); *B60W 50/085* (2013.01); *B60W 2050/0089* (2013.01); *Y10T 477/656* (2015.01); *Y10T 477/68* (2015.01); *Y10T 477/79* (2015.01)

(56) References Cited

U.S. PATENT DOCUMENTS

| | | | |
|---|---|---|---|
| 8,744,739 B2 | 6/2014 | Wurthner et al. | |
| 2010/0161188 A1* | 6/2010 | Turski | B60T 8/175 701/67 |
| 2012/0143416 A1* | 6/2012 | Park | B60W 20/106 701/22 |
| 2012/0179342 A1* | 7/2012 | Noumura | B60W 10/06 701/54 |
| 2015/0073679 A1* | 3/2015 | Darnell | B60W 30/18172 701/84 |
| 2015/0203119 A1* | 7/2015 | Bird | B60W 50/082 701/37 |

FOREIGN PATENT DOCUMENTS

| | | |
|---|---|---|
| DE | 103 05 298 A1 | 8/2004 |
| DE | 10 2005 035 302 A1 | 2/2007 |
| DE | 10 2008 002 070 A1 | 12/2009 |
| DE | 10 2009 046 344 A1 | 5/2011 |
| DE | 10 2010 048 263 A1 | 5/2011 |
| DE | 10 2011 015 510 A1 | 1/2012 |
| WO | WO 03/106211 A1 | 12/2003 |
| WO | WO 2007/116123 A1 | 10/2007 |

OTHER PUBLICATIONS

German language Office Action dated Dec. 17, 2012 (Four (4) pages).

* cited by examiner

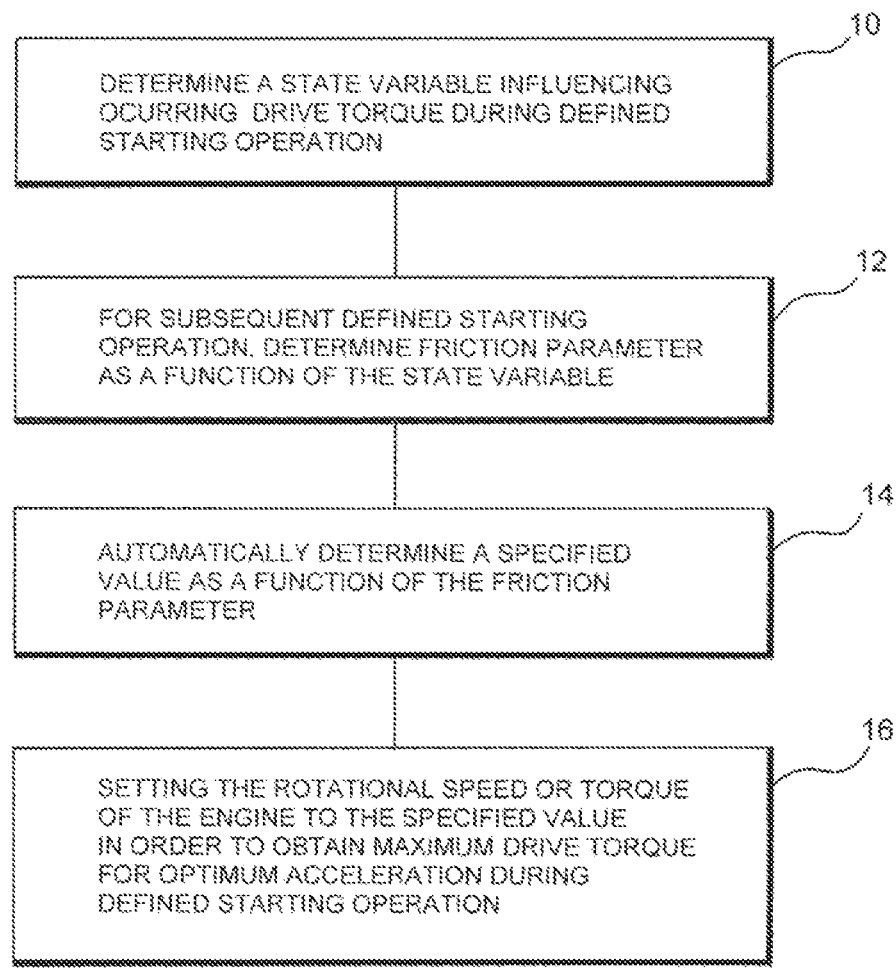

PROCESS FOR PREPARING A DEFINED STARTING OPERATION SELECTABLE BY THE DRIVER

CROSS REFERENCE TO RELATED APPLICATIONS

This application is a continuation of PCT International Application No. PCT/EP2013/052189, filed Feb. 5, 2013, which claims priority under 35 §119 from German Patent Application No. 10 2012 201 841.7, filed Feb. 8, 2012, the entire disclosures of which are herein expressly incorporated by reference.

BACKGROUND AND SUMMARY OF THE INVENTION

The invention relates to a process for preparing a defined starting operation of a motor vehicle selectable by the driver. The motor vehicle has a starting element arranged between an engine and a transmission. In the event of a maximal power demand by the driver and in the event of the selection of the defined starting operation, the rotational speed or the torque of the engine is set to a specified value via an electronic control unit. The specified value is automatically determined as function of a determined friction parameter, by which at least one relative prediction concerning the transmissible drive torque to be expected for the acceleration operation can be made, such that, by way of this specified value, during the starting and acceleration operation following the preparation, the maximally possible drive torque is achieved for the best possible acceleration.

Such a process is known, for example, in connection with a racing-start starting operation ("launch control") in the case of BMW M vehicles. This launch control permits an optimal vehicle acceleration on an anti-skid road surface. This known launch control is selected, while the vehicle is stationary, by deactivating the slip control system, selecting a special drive program, moving the selector lever, while the vehicle is stationary, to a defined position and completely depressing the accelerator pedal. Subsequently, the launch control will be prepared by setting the rotational engine speed to a fixed value while the clutch is still disengaged. The vehicle will accelerate with the releasing of the selector lever; i.e. the prepared starting operation will subsequently be continued by means of a clutch control for the purpose of an optimal acceleration.

From German Patent Document DE 103 05 297 A1, a corresponding process is known for controlling a starting operation selectable by the driver, in which case, first, the rotational engine speed (under the condition of an optimal friction) is set to a specified rotational engine speed. During the starting operation, an automatic control of the clutch torque is carried out for achieving a maximum possible acceleration, the engine torque being reduced despite a maximum power demand, when the friction prevailing between the driving wheels and the road is lower than a specified threshold. The circumstance is thereby taken into account that there is actually a lower friction than the assumed optimal friction.

In German Patent Document DE 103 05 298 A1, an alternative process is suggested for taking into account a lower friction. For the preparation of a defined starting operation that can be selected by the driver, while the clutch is disengaged, the rotational speed of the internal-combustion engine is set to a specified rotational engine speed value, in which case, the specified rotational engine speed is determined as a function of at least one parameter, which is formed of at least one known operating variable and by which at least one relative prediction can be made concerning the drive torque to be expected when the clutch is engaged.

For determining the rotational engine speed, a friction parameter, for example, is included. The friction parameter reflects the friction of the tires to be expected on the road. For determining the friction parameter, for example, the ambient temperature, the tire mixture, the vehicle weight, the road type and/or the road condition are taken into account as operating variables. However, the predicted friction parameter may deviate from the actual friction because of various influences that cannot be precisely predicted, so that an optimal acceleration is not achieved.

It is an object of the invention to provide an improved process with respect to the state of the art for the preparation of a defined starting operation selectable by the driver.

This and other objects are achieved by a process for preparing a defined starting operation of a motor vehicle selectable by the driver. The motor vehicle has a starting element arranged between an engine and a transmission. In the event of a maximal power demand by the driver and in the event of the selection of the defined starting operation, the rotational speed or the torque of the engine is set to a specified value, via an electronic control unit. The specified value is automatically determined as function of a determined friction parameter, by which at least one relative prediction concerning the transmissible drive torque to be expected for the acceleration operation can be made, such that, by way this specified value, during the starting and acceleration operation following the preparation, the maximally possible drive torque is achieved for the best possible acceleration. The friction parameter is determined as a function of a state variable determined during a preceding defined starting operation, which state variable influences the occurring drive torque.

The invention takes into account influences when determining the course of the torques, already in preceding defined starting operations, did not result an optimal acceleration of the vehicle.

According to the invention, in a known manner, for the preparation of a defined starting operation selectable by the driver (particularly of a so-called racing start or a so-called launch control) of a motor vehicle, by way of starting element (such as a controllable clutch or a torque converter) arranged between an engine (internal-combustion engine and/or electric motor) and a transmission, in the case of a maximal power demand by the driver and in the case of a selection of the defined starting operation, the rotational speed or the torque of the engine is set to a specified value (rotational engine speed or engine torque) by way of an electronic control unit. In this case the rotational engine speed or the engine torque is automatically determined by the electronic control unit as a function of a friction parameter, by which at least a relative prediction can be made concerning the transmissible drive torque to be expected for the acceleration operation, such that, during the starting operation following the preparation, the maximally possible drive torque is achieved for the best possible acceleration.

Other objects, advantages and novel features of the present invention will become apparent from the following detailed description of one or more preferred embodiments when considered in conjunction with the accompanying drawings.

BRIEF DESCRIPTION OF THE DRAWING

The FIGURE is a high level flow chart illustrating the process for preparing a defined starting operation of a motor vehicle.

DETAILED DESCRIPTION OF THE DRAWING

The FIGURE is an extremely simplified flowchart illustrating the process for preparing the defined starting operation of the motor vehicle. In a preceding defined starting operation, a state variable is determined that influences an occurring drive torque (10). For a subsequent defined starting operation, a friction parameter s determined as a function of the state variable determined in the preceding defined starting operation (12). An electronic control unit automatically determines specified value as a function of the determined friction parameter (14) by which friction parameter at least one relative prediction concerning a transmissible drive torque to be expected for an acceleration operation can be made. The electronic control unit sets a rotational speed or torque to the specified value in order to obtain a maximum drive torque for optimum acceleration during the defined starting operation (16).

According to the invention, when determining the friction parameter, a state variable is taken into account, which was determined during a preceding defined starting operation. The state variable reflects the friction and thereby influences the occurring drive torque.

The state variable determined from the preceding defined starting operation can be taken into account during the determination of the friction parameter such that, from a specified optimal friction parameter and/or a friction parameter to be expected and determined from operating parameters, or a friction parameter determined for a preceding defined starting ration a first (base) friction parameter is determined, which will then be corrected as a function of the state variable determined during the preceding defined starting operation; i.e. the friction parameter is (continuously) corrected as a function of the state variable determined during a preceding defined starting operation, which state variable influences the occurring drive torque.

By correcting the (base) friction parameter on he basis of the determined state variable during preceding defined starting operations, the following defined starting operations can thereby be significantly improved with respect to a desired optimal acceleration.

Advantageously, the state variable is the occurring slip between the drive wheels and the road (within a defined speed window). Accordingly, the friction parameter is corrected as a function of the slip value determined during a preceding defined starting operation, as the state variable.

The taking into account of the slip value can take place such that the friction parameter is corrected as a function of the deviation of the slip value determined during a preceding defined starting operation in a defined speed window, to a target slip value specified for this speed window, particularly such that, during the subsequent starting operation, the occurring slip value approaches the target slip value. For this purpose, a characteristic reference/or target slip curve is stored in the electronic control unit. If the slip value determined in the (preceding) defined starting operation deviates in a defined speed window from the original (or already corrected and currently valid) reference value, a subsequent adaptation takes place. The subsequent starting will therefore be continuously improved.

Advantageously, by use of the determined friction parameter, the known vehicle weight, a determined vehicle acceleration and/or the changing rotational speed ratios, a feed forward control of the transmissible drive torque or wheel torque can be carried out during the entire acceleration operation, i.e. this information is taken into account not only for the rotational speed or torque input of the start but also for an actuation during the entire acceleration operation. The complete wheel torque course can therefore he preliminarily controlled by way of the vehicle speed.

The advantage of this friction value learning function is mainly the fact that subsequent starts with an optimally adapted friction value can be permitted even in the case of poorer coefficients of friction because, from the start, the maximally present traction can be utilized without the intervention of a corresponding automatic control system. Delays as a result of transmission and response times are therefore avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for preparing a defined starting operation of a motor vehicle equipped with a starting element arranged between an engine and a transmission, the process comprising the acts of:
    in an event of a maximal power demand by a driver and a selection of the defined starting operation by the driver, setting a rotational speed or torque of the engine to a specified value via an electronic control unit, wherein
    the specified value is automatically determined as a function of a determined friction parameter, by which friction parameter at least one relative prediction concerning a transmissible drive torque to be expected for an acceleration operation can he made such that, by use of the specified value, a maximally possible drive torque is achieved for an optimum possible acceleration during the starting operation and acceleration operating following the preparing the defined starting operation, and
    the friction parameter being determined as a function of a state variable determined during a preceding defined starting operation, the state variable influencing an occurring drive torque.

2. The process according to claim 1, wherein
the rotational speed or the torque of the engine is set to a specified rotational engine speed or a specified engine torque.

3. The process according to claim 1, wherein
the friction parameter is determined such that a specified optimal friction parameter and/or a friction parameter to be expected and determined from operation variables, or a friction parameter determined for a preceding defined starting operation, is corrected as a function of the state variable determined during the preceding defined starting operation.

4. The process according to claim 2, wherein
the friction parameter is determined such that a specified optimal friction parameter and/or a friction parameter to be expected and determined from operation variables, or a friction parameter determined for a preceding defined starting operation, is corrected as a function of the state variable determined during the preceding defined starting operation.

5. The process according to claim 3, wherein
the friction parameter is corrected as a function of a slip value as the state variable determined during the preceding defined starting operation.

6. The process according to claim 4, wherein the friction parameter is corrected as a function of a slip value as the state variable determined during the preceding defined starting operation.

7. The process according to claim 5, wherein the friction parameter, as a function of a deviation of the slip value determined during the preceding defined starting operation in a defined speed window, is corrected to a target slip value specified for said speed window such that, during the subsequent starting operation, a occurring slip value will approach the target slip value.

8. The process according to claim 3, wherein the friction parameter, as a function of a deviation of the slip value determined during the preceding defined starting operation in a defined speed window, is corrected to a target slip value specified for said speed window such that, during the subsequent starting operation, an occurring slip value will approach the target slip value.

9. The process according to claim 1, wherein by use of the determined friction parameter, a vehicle weight, a vehicle acceleration and/or the changing rotational speed ratios, a preliminary feed forward control of the transmissible drive torque or wheel torque is carried out during the entire acceleration operation.

10. A process for preparing a defined starting operation of a motor vehicle equipped with a starting element arranged between an engine and a transmission, the process comprising the acts of:

during a preceding defined starting operation, determining a state variable that influences an occurring drive torque; and in preparing the defined starting operation, determining a friction parameter as a function of the state variable determined during the preceding defined starting operation, the friction value being indicative of a transmissible drive torque to be expected for the acceleration operation;

upon maximum power demand and a selection of the defined starting operation, automatically determining, via an electronic control unit, a specified value as a function of the determined friction parameter, the electronic control unit setting a rotational speed or a torque of the engine to the specified value to obtain a maximum possible drive torque to achieve an optimum acceleration.

* * * * *